United States Patent
Ito et al.

(10) Patent No.: US 10,608,547 B2
(45) Date of Patent: Mar. 31, 2020

(54) INVERTER-INTEGRATED ELECTRIC COMPRESSOR AND CIRCUIT BOARD, AND METHOD FOR MANUFACTURING CIRCUIT BOARD

(71) Applicant: MITSUBISHI HEAVY INDUSTRIES THERMAL SYSTEMS, LTD., Minato-ku, Tokyo (JP)

(72) Inventors: Masato Ito, Tokyo (JP); Kenichi Aiba, Tokyo (JP); Takashi Nakagami, Tokyo (JP); Kyohei Watanabe, Tokyo (JP); Naoki Nishikawa, Tokyo (JP); Katsuhiro Saito, Tokyo (JP); Kenji Shimizu, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 71 days.

(21) Appl. No.: 15/764,351

(22) PCT Filed: Aug. 22, 2016

(86) PCT No.: PCT/JP2016/074353
§ 371 (c)(1),
(2) Date: Mar. 29, 2018

(87) PCT Pub. No.: WO2017/068848
PCT Pub. Date: Apr. 27, 2017

(65) Prior Publication Data
US 2018/0281565 A1    Oct. 4, 2018

(30) Foreign Application Priority Data
Oct. 19, 2015   (JP) .................... 2015-205628

(51) Int. Cl.
*H02M 7/00*   (2006.01)
*H02M 1/00*   (2006.01)

(52) U.S. Cl.
CPC .... *H02M 7/003* (2013.01); *H02M 2001/0009* (2013.01)

(58) Field of Classification Search
CPC ..................... H02M 7/003; H02M 2001/0009
See application file for complete search history.

(56) References Cited

U.S. PATENT DOCUMENTS 4,307,305 A * 12/1981 Morris ................... G01R 19/22
                                                        307/653
5,652,425 A    7/1997 Sawada et al.
(Continued)

FOREIGN PATENT DOCUMENTS

JP    8-139342 A    5/1996
JP    2005-294940 A    10/2005
(Continued)

OTHER PUBLICATIONS

International Search Report dated Sep. 13, 2016 issued in International Patent Application No. PCT/JP2016/074353 with an English Translation.
(Continued)

*Primary Examiner* — Fred E Finch, III
*Assistant Examiner* — Rafael O. De León Domenech
(74) *Attorney, Agent, or Firm* — Birch, Stewart, Kolasch & Birch, LLP

(57) ABSTRACT

To improve the accuracy of detecting a current flowing through an electric compressor after operation of the electric compressor, the electric compressor having a large change in temperature before and after operation. An inverter-integrated electric compressor (1) that compresses and discharges a refrigerant suctioned therein, includes an inverter
(Continued)

device (2) provided with a circuit board (60) mounted with an inverter circuit (40), the inverter device (2) being integrally incorporated in an inverter case. The circuit board (60) is provided with a current detection circuit (30) that detects an input current flowing through the inverter circuit (40), and an offset correction circuit (20). The current detection circuit (30) includes a shunt resistor (32) that is serially connected to the inverter circuit (40) and detects a current, and a first amplifier (31) that amplifies and outputs a voltage appearing as a voltage drop in the shunt resistor (32). The offset correction circuit (20) includes a second amplifier (21) that performs an offset correction of the first amplifier (31). The first amplifier (31) and the second amplifier (21) are integrated into a single integrated circuit.

4 Claims, 4 Drawing Sheets

(56) References Cited

U.S. PATENT DOCUMENTS

| | | | |
|---|---|---|---|
| 2011/0206544 A1* | 8/2011 | Saito | F04B 39/121 417/410.1 |
| 2011/0211981 A1* | 9/2011 | Saito | F04B 39/121 417/410.1 |
| 2014/0183995 A1* | 7/2014 | Saitou | F04B 35/04 310/72 |
| 2016/0353595 A1 | 12/2016 | Yogo et al. | |

FOREIGN PATENT DOCUMENTS

| | | |
|---|---|---|
| WO | WO 2004/062079 A1 | 7/2004 |
| WO | WO 2015/141654 A1 | 9/2015 |

OTHER PUBLICATIONS

Written Opinion dated Sep. 13, 2016 issued in International Patent Application No. PCT/JP2016/074353 with an English Translation.

Japanese Office Action dated Apr. 9, 2019 in related Japanese Patent Application No. 2015-205628 with an English Translation.

* cited by examiner

INVERTER-INTEGRATED ELECTRIC COMPRESSOR AND CIRCUIT BOARD, AND METHOD FOR MANUFACTURING CIRCUIT BOARD

TECHNICAL FIELD

The present invention relates to an inverter-integrated electric compressor and a circuit board, and a method for manufacturing a circuit board.

BACKGROUND ART

An electric compressor inverter that drives an electric compressor used in vehicular air conditioning equipment includes an input current detection circuit. After a voltage between both ends of a shunt resistor produced as a result of a flow of an input current through the shunt resistor is amplified by an op-amp circuit, this input current detection circuit performs analog/digital (A/D) conversion in a central processing unit (CPU) and detects the input current of the inverter. The input current detected by the input current detection circuit is multiplied by the input voltage to obtain the power consumption of the electric compressor.

In the automobile industry in recent years, fuel-efficient driving has been in demand and, in order to accurately detect the power consumption of an electric compressor that achieves fuel-efficient driving, the accuracy requirements for detecting the inverter input current have become increasingly stringent.

Patent Document 1 described below discloses a motor control device that includes a first op-amp that amplifies an electric potential difference between both ends of a shunt resistor and outputs the difference to a CPU, and a second op-amp that detects an offset voltage. The motor control device corrects a motor load current value computed on the basis of the output of the first op-amp, which changes with the passage of time.

CITATION LIST

Patent Document

Patent Document 1: WO 2004/062079

SUMMARY OF INVENTION

Technical Problems

However, an op-amp circuit used in an input current detection circuit generates an error in an output signal in accordance with a change in temperature. This error leads to a decrease in input current accuracy, necessitating error reduction and improvements in input current accuracy. In particular, an electric compressor used in vehicular air conditioning equipment, for example, is high in temperature before startup due to the radiant heat of the engine and the like. However, after startup and operation, the inverter is cooled by a refrigerant that flows therethrough (suctioned refrigerant), indirectly cooling a substrate side that controls the inverter as well. As a result, the electric compressor for vehicular air conditioning equipment is problematic in that, due to the large change in temperature before and after operation, the detection error of the input current is large.

Nevertheless, the above-described Patent Document 1 does not suggest use in a device in which the change in temperature before and after operation is large, such as in an electric compressor for vehicular air conditioning equipment, and thus cannot solve the problem of having a large detection error of input current after operation of the electric compressor.

In light of the above, an object of the present invention is to provide an inverter-integrated electric compressor and a circuit board, and a method for manufacturing a circuit board capable of improving the accuracy of detecting a current flowing through an electric compressor after operation of the electric compressor, the electric compressor having a large change in temperature before and after operation.

Solution to Problems

A first aspect of the present invention is an inverter-integrated electric compressor that compresses and discharges a refrigerant suctioned into the inverter-integrated electric compressor, and includes an inverter device provided with a circuit board mounted with an inverter circuit, the inverter device being integrally incorporated in an inverter housing portion. The circuit board is provided with a current detection circuit that detects an input current flowing through the inverter circuit, and an offset correction circuit. The current detection circuit includes a current detection resistor serially connected to the inverter circuit and detects a current, and a first amplifier that amplifies and outputs a voltage appearing as a voltage drop in the current detection resistor. The offset correction circuit includes a second amplifier that performs an offset correction of the first amplifier. The first amplifier and the second amplifier are integrated into a single integrated circuit.

According to the first aspect of the present invention, the inverter-integrated electric compressor incorporates a circuit board obtained by integrating the first amplifier that amplifies and outputs a voltage appearing as a voltage drop in the current detection resistor, and a second amplifier of the offset correction circuit that performs an offset correction of the first amplifier into a single integrated circuit. The current detection resistor is provided to the current detection circuit that detects an input current that flows through the inverter circuit, is serially connected to the inverter circuit, and is configured to detect a current.

As a result, while the inverter-integrated electric compressor has a large change in temperature after startup and operation compared to before startup due to the effects of the suctioned refrigerant, the first amplifier and the second amplifier integrated into the same integrated circuit have substantially the same temperature, making it possible to make the offset values of the first amplifier and the second amplifier equal even when a temperature drift occurs, and thus decrease the detection error of the input current that flows through the inverter circuit to the extent possible.

In the above-described inverter-integrated electric compressor, the current detection circuit may further include a first peripheral component for adjusting a value of the first amplifier, and the offset correction circuit may further include a second peripheral component for adjusting a value of the second amplifier. In such a configuration, the first peripheral component of the current detection circuit and the second peripheral component of the offset correction circuit each include a resistor from a same lot in a manufacturing stage.

With the resistors of each peripheral component being from the same lot, the current detection circuit and the offset correction circuit exhibit less individual difference in temperature characteristics, accuracy variance, and the like, making it possible to decrease the detection error of the input current.

In the current detection circuit and the offset correction circuit of the above-described inverter-integrated electric compressor, the first amplifier, the second amplifier, the resistor included in the first peripheral component, and the resistor included in the second peripheral component may be mounted on a same plane of the circuit board and provided to a same ground plane.

With the amplifiers and the resistors of the current detection circuit and the offset correction circuit mounted on the same plane of the circuit board and provided to the same ground plane, a temperature unevenness of the current detection circuit and the offset correction circuit decreases. This makes it possible to further decrease the detection error of the input current that flows through the inverter circuit.

A second aspect of the present invention is a circuit board integrally incorporated as an inverter device in an inverter housing portion of an inverter-integrated electric compressor that compresses and discharges suctioned refrigerant. The circuit board includes an inverter circuit mounted thereon, a current detection circuit, and an offset correction circuit. The current detection circuit includes a current detection resistor serially connected to the inverter circuit and detects a current, and a first amplifier that amplifies and outputs a voltage appearing as a voltage drop in the current detection resistor, the current detection circuit detecting an input current flowing through the inverter circuit. The offset correction circuit includes a second amplifier that performs an offset correction of the first amplifier. The first amplifier and the second amplifier are integrated into a single integrated circuit.

A third aspect of the present invention is a method for manufacturing a circuit board integrally incorporated as an inverter device in an inverter housing portion of an inverter-integrated electric compressor that compresses and discharges a refrigerant suctioned into the inverter-integrated electric compressor. The method includes the steps of mounting an inverter circuit, and integrating a first amplifier of a current detection circuit that amplifies and outputs a voltage appearing as a voltage drop in a current detection resistor, is serially connected to the inverter circuit, and detects a current, and a second amplifier of an offset correction circuit that performs offset correction of the first amplifier into a single integrated circuit. The current detection circuit includes a first peripheral component for adjusting a value of the first amplifier, and the offset correction circuit includes a second peripheral component for adjusting a value of the second amplifier. The first peripheral component of the current detection circuit and the second amplifier of the offset correction circuit each include a resistor from a same lot in a manufacturing stage.

Advantageous Effects of Invention

According to the present invention, it is possible to improve the accuracy of detecting a current flowing through an electric compressor after operation of the electric compressor, the electric compressor having a large change in temperature before and after operation.

DESCRIPTION OF EMBODIMENTS

An inverter-integrated electric compressor and a circuit board, and a method for manufacturing a circuit board according to the present invention are described below, with reference to the accompanying drawings.

The inverter-integrated electric compressor described below is an embodiment of the present invention in which the inverter-integrated electric compressor is used in a vehicular air conditioning device.

Figure 1:
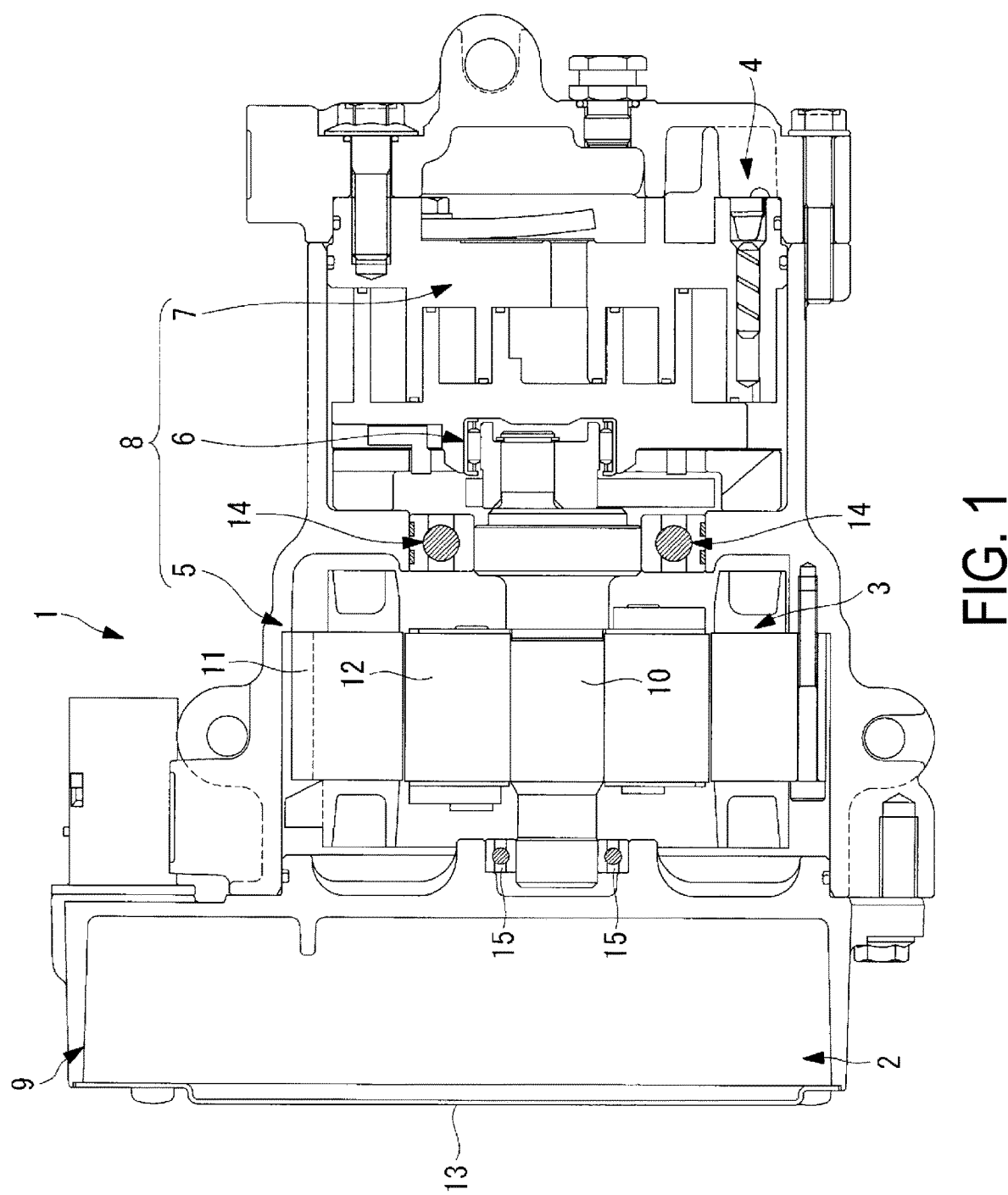
FIG. 1 is a vertical cross-sectional view for explaining a schematic configuration of an inverter-integrated electric compressor according to the present invention.

FIG. 1 illustrates a vertical cross-sectional view of the main components of an inverter-integrated electric compressor according to an embodiment of the present invention.

An inverter-integrated electric compressor 1 is provided with a housing 8 made from an aluminum alloy and constituting an outer shell. The housing 8 is configured by integrally connecting an electric motor housing 5 for containing an electric motor 3, a compressor housing 7 for containing a scroll compression mechanism (hereinafter referred to as "compression mechanism") 4, and a bearing housing 6 therebetween.

In the inverter-integrated electric compressor 1, the electric motor 3 and the compression mechanism 4 contained in the housing 8 are connected via a main shaft (rotating shaft) 10, and the electric motor 3 is rotationally driven via an inverter device 2 described later, thereby driving the compression mechanism 4.

A stator 11 and a rotor 12 constituting the electric motor 3 are incorporated in the electric motor housing 5. The compression mechanism 4 and the electric motor 3 are connected via the main shaft 10 and rotate the electric motor 3, thereby driving the compression mechanism 4. The main shaft 10 is rotatably supported by main bearings 14 maintained in the bearing housing 6, and sub-bearings 15 maintained at an end portion of the electric motor housing 5.

Further, a refrigerant intake port (not illustrated) is provided to the end portion of the electric motor housing 5, intake piping of a refrigeration cycle is connected to the refrigerant intake port, and a refrigerant gas having low pressure is suctioned into the electric motor housing 5. The refrigerant gas flows through the electric motor housing 5, cools the electric motor housing 3, is subsequently suctioned into the compression mechanism 4 and compressed, and turns into a high-temperature, high-pressure refrigerant gas. This refrigerant gas is then discharged from a discharge port (not illustrated) provided to an end portion of the compressor housing 7 to discharge piping of the refrigeration cycle.

The electric motor 3 is driven via the inverter device 2, and the rotation speed is variably controlled in accordance with an air conditioning load. In the present embodiment, the inverter device 2 is configured so that a circuit board 60 (refer to FIGS. 3, 4, and 5) is housed in an interior of an inverter case (inverter housing portion) 9 integrally formed on an outer periphery of the housing 8, for example, a left side of the housing 8 as viewed in the FIGS. 3, 4, and 5, and integrated with the inverter-inverter-integrated electric compressor 1. The inverter case 9 is configured so as to be closed off by mounting an inverter cover 13 after the inverter device 2 is incorporated.

Note that the electric motor 3 and the compression mechanism 4 provided inside the housing 8 may be well known, and descriptions thereof will be omitted.

The inverter device 2 is electrically connected to the electric motor 3 via a bus bar, a glass insulating terminal, a motor terminal, a lead wire, or the like (not illustrated).

Figure 2:
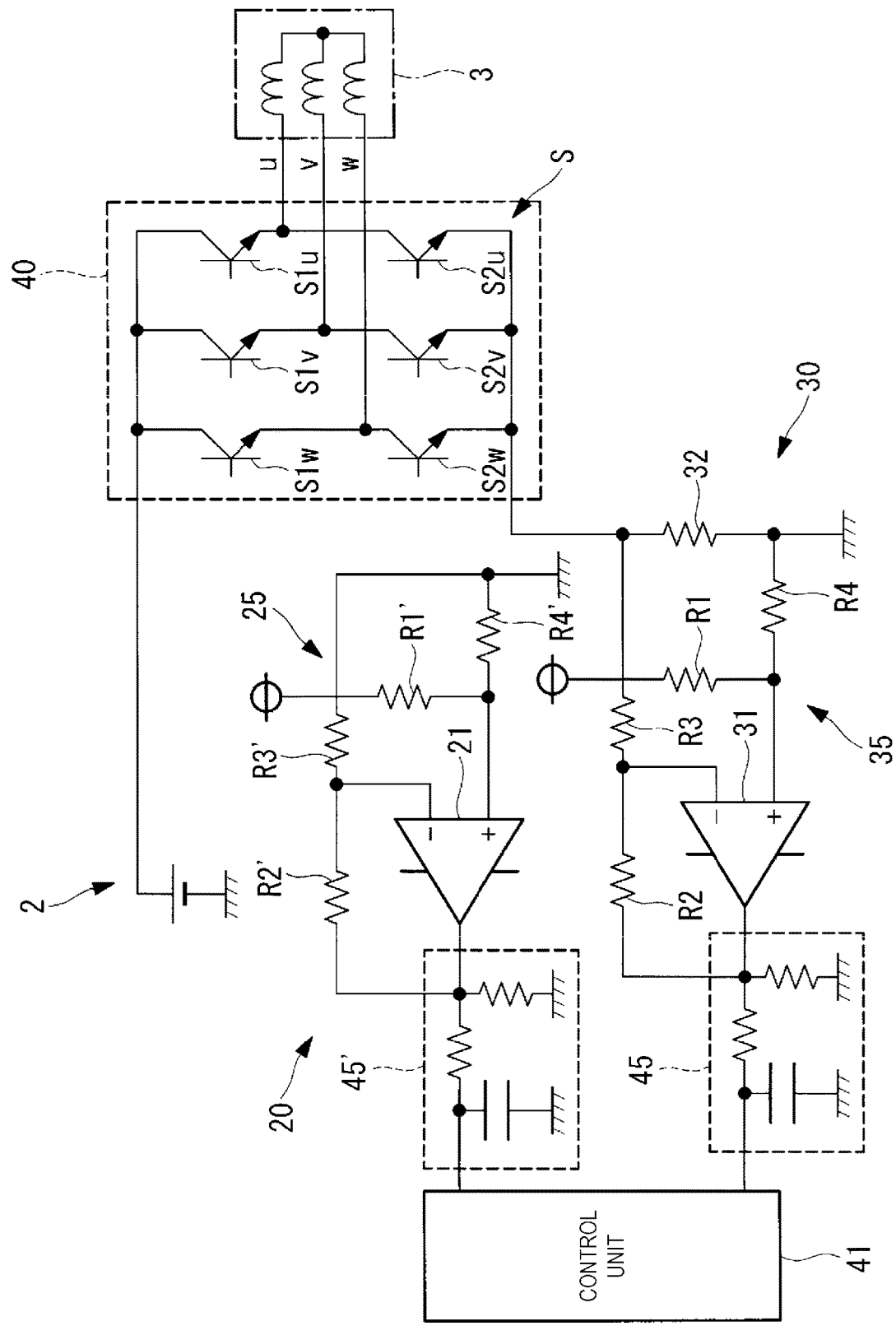
FIG. 2 is a circuit schematic view of an inverter device of the inverter-integrated electric compressor according to the present invention.

FIG. 2 illustrates a schematic view of circuits included in the inverter device 2. As illustrated in FIG. 2, the inverter device 2 includes an inverter circuit 40, a current detection circuit 30, an offset cancellation circuit (offset correction circuit) 20, a noise removing circuit 45, and a control unit 41.

Figure 3:
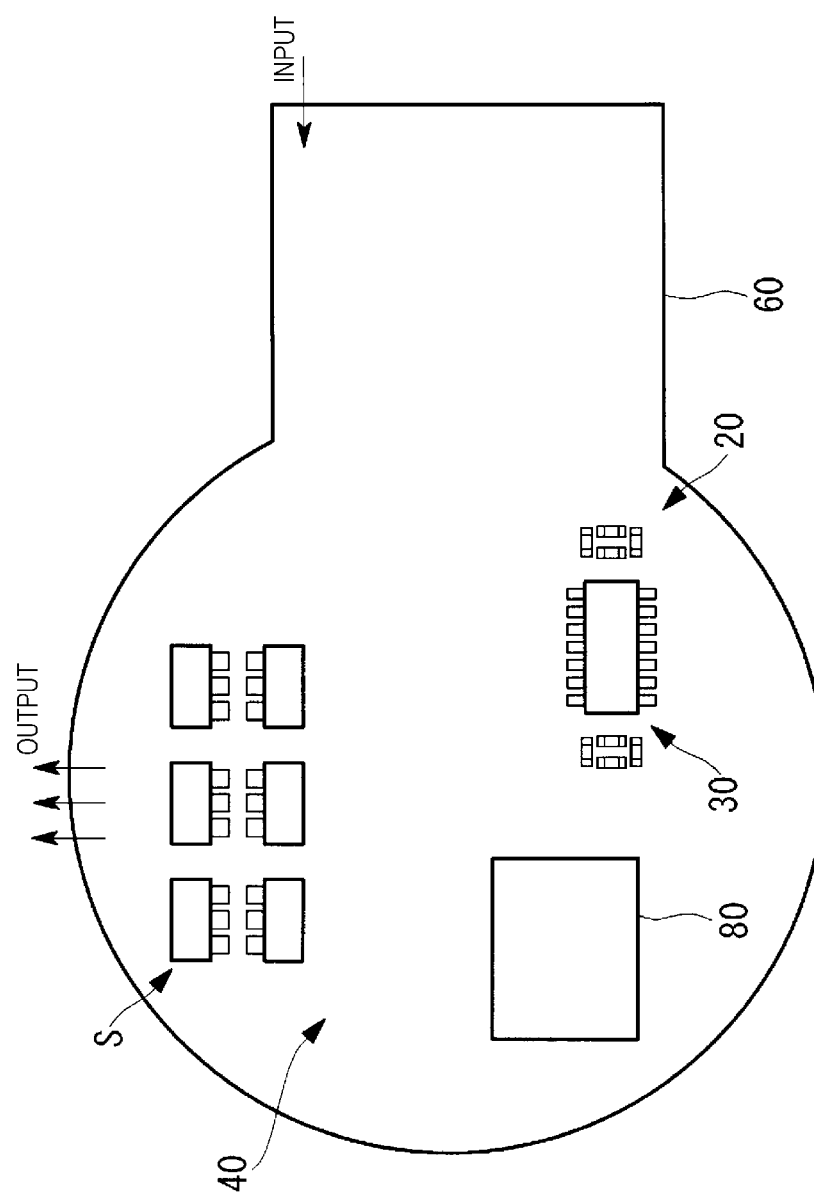
FIG. 3 is a schematic view of a circuit board of the inverter device of the inverter-integrated electric compressor according to the present invention.

In the present embodiment, the inverter device 2 includes elements that operate under low voltage, such as a multiplicity of heat-generating electrical components (switching elements S) described later, a central processing unit (CPU) 80, and the current detection circuit 30, as illustrated in FIG. 3. The inverter circuit 40 that includes the switching elements S, the current detection circuit 30, and the offset cancellation circuit 20 are provided to the circuit board 60.

The inverter circuit 40 includes upper arm switching elements S1u, S1v, S1w and lower arm switching elements S2u, S2v, S2w (switching elements S) provided correspondingly to each phase. In the inverter circuit 40, these switching elements S are driven by a gate driver (not illustrated) on the basis of a control signal from a host control device, thereby converting DC power supplied from a power supply unit mounted on the vehicle to 3-phase AC power, and outputting and supplying the power from a UWV terminal to the electric motor 3. The switching elements S are power semiconductor devices such as insulated gate bipolar transistors (IGBTs), for example.

Further, the inverter circuit 40 is configured so that the power semiconductor devices, which are heat-generating electrical components (heat-generating elements), are cooled by a refrigerant. Note that the inverter circuit 40 includes a control board mounted with a switching circuit and control circuit of the switching circuit, and high-voltage components such as a smoothing capacitor and inductor coil. The inverter circuit 40 is a known circuit, and description thereof will be omitted.

The current detection circuit 30 includes a first amplifier 31 and a shunt resistor (current detection resistor) 32. Further, the current detection circuit 30 also includes a first peripheral component 35 including peripheral resistors R1, R2, R3, R4 provided to adjust a value output from the first amplifier 31.

The shunt resistor 32 is inserted between the inverter circuit 40 and a ground, is serially connected to the inverter circuit 40, and detects a flowing current.

The first amplifier 31 is provided with both ends connected to both ends of the shunt resistor 32, amplifies a voltage appearing as a voltage drop in the shunt resistor 32, and outputs the voltage to the control unit 41.

The offset cancellation circuit 20 includes a second amplifier 21 that detects an offset voltage of the first amplifier 31. Specifically, the second amplifier 21 of the offset cancellation circuit 20 is provided with both ends connected to ground electric potential, and continually detects a value of 0 V and outputs the value to the control unit 41. Further, the offset cancellation circuit 20 is also provided with a second peripheral component 25 including peripheral resistors R1', R2', R3', R4' provided to adjust the value output from the second amplifier 21.

Note that, as illustrated in FIG. 2, the current detection circuit 30, compared to the offset cancellation circuit 20, differs in that the current detection circuit 30 is provided with the shunt resistor 32. As amplifying circuits, the current detection circuit 30 and the offset cancellation circuit 20 similarly include the first peripheral component 35 and the second peripheral component 25, and a value equivalent to the offset of the current detection circuit 30 is output from the offset cancellation circuit 20 to the control unit 41.

The noise removing circuit 45 includes a resistor and a capacitor, and removes noise from a signal output from the current detection circuit 30.

A noise removing circuit 45' includes a resistor and a capacitor, and removes noise from a signal output from the offset cancellation circuit 20.

The control unit 41 is, for example, provided with the CPU 80, and a random access memory (RAM), a computer readable recording medium, and the like (not illustrated). A sequence of processing for performing various functions described below is stored on a recording medium or the like in the form of a program, and the various functions described below are performed by the CPU 80 loading this program from the recording medium into the RAM or the like, and executing information processing and computational processing.

Specifically, the control unit 41, prior to startup of the inverter-integrated electric compressor 1, measures the offset voltage of the first amplifier 31 acquired from the current detection circuit 30, stores the offset voltage in a storage unit (not illustrated), corrects a zero voltage of the first amplifier 31 by correcting the stored offset voltage portion, performs A/D conversion on the corrected output value of the first amplifier 31, further converts the value to a current value, and detects the input current of the inverter circuit 40.

Further, the control unit 41, after startup (during operation) of the inverter-integrated electric compressor 1, corrects the offset voltage of the first amplifier 31 by sequentially correcting the voltage output value of the first amplifier 31 by the output value (0 V) of the second amplifier 21. The control unit 41 performs A/D conversion on the corrected voltage output value of the first amplifier 31, further converts the value to a current value, and detects the input current of the inverter circuit 40. That is, the control unit 41 calculates the detected voltage value in which the offset voltage was canceled as in Equation (1) below.

(Detected voltage value)=(Output value of first amplifier)−(Output value of second amplifier)    (1)

In this way, the value is sequentially corrected during operation, making it possible to cancel the offset voltage from the change in temperature after operation.

The circuit board of the inverter device of the inverter-integrated electric compressor according to the present embodiment is described below.

Figure 4:
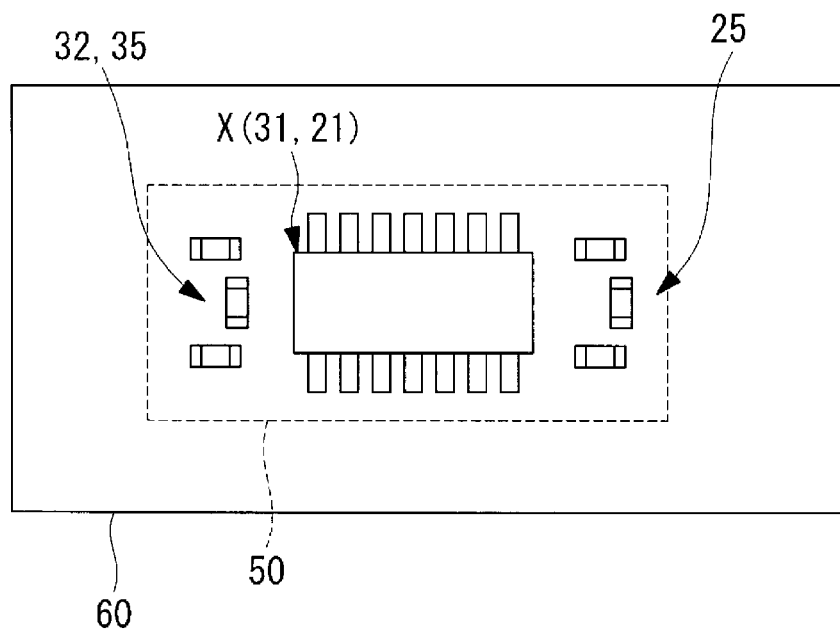
FIG. 4 is a schematic view illustrating a front surface of the circuit board of the inverter device of the inverter-integrated electric compressor according to the present invention.
Figure 5:
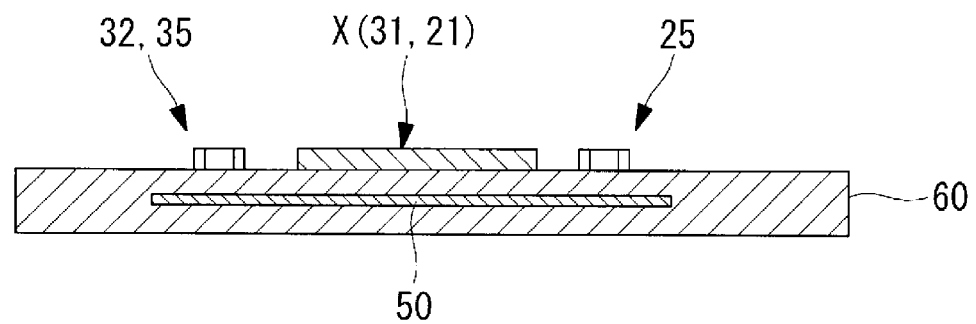
FIG. 5 is a schematic view of a cross section of the circuit board of the inverter device of the inverter-integrated electric compressor according to the present invention.

FIGS. 4 and 5 illustrate an example of the arrangement of each component of the circuit board 60 in the inverter device 2. FIG. 4 illustrates a schematic view of a substrate surface of the circuit board 60, and FIG. 5 illustrates a vertical cross-sectional view of the circuit board 60.

The reference sign X in FIG. 4 indicates an integrated circuit. The integrated circuit X integrally includes the first amplifier 31 of the above-described current detection circuit 30, and the second amplifier 21 of the offset cancellation circuit 20. With the first amplifier 31 and the second amplifier 21 integrated into the single integrated circuit X, a temperature differential of the elements of the first amplifier 31 and the second amplifier 21 is small, and also, characteristics as semiconductors are similar, even when a change in temperature in the circuit board 60 occurs.

The first amplifier 31 and the second amplifier 21 are thus integrated into the single integrated circuit X, making it possible to correctly detect a temperature drift, and decrease the offset error that occurs as a result of the difference in offset values of the first amplifier 31 and the second amplifier 21 due to the effects of the temperature drift to the extent possible.

As illustrated in FIG. 4, the integrated circuit X that includes the first amplifier 31 and the second amplifier 21, the first peripheral component 35 that includes the peripheral resistors R1 to R4, and the second peripheral component 25 that includes the peripheral resistors R1' to R4' are all mounted on a same plane of the circuit board 60 and arranged on a same ground plane 50. With the current detection circuit 30 and the offset cancellation circuit 20 being mounted on the same plane and on the same ground plane 50, the temperature unevenness between both circuits can be reduced.

The ground plane 50 is arranged on an inner layer of the circuit board 60 as illustrated in FIG. 4.

Preferably, components used in the current detection circuit 30 and the offset cancellation circuit 20 in the present embodiment are from a same lot in a manufacturing stage. Specifically, the peripheral resistors R1 to R4 of the current detection circuit 30 and the peripheral resistors R1' to R4' of the offset cancellation circuit 20 are from the same lot in the manufacturing stage. With the components used in the current detection circuit 30 and the offset cancellation circuit 20 being from the same lot in the manufacturing stage, individual differences in temperature characteristics and initial accuracy errors are reduced.

The operation of the inverter-integrated electric compressor 1 according to the present embodiment is described below.

The inverter-integrated electric compressor 1, before startup, rises in temperature due to the effects of radiant heat of the engine of the vehicle and the like, causing the temperature of the circuit board 60 of the inverter device 2 to rise as well. Before startup of the inverter-integrated electric compressor 1, the input current of the inverter circuit 40 is detected by correcting the zero voltage of the first amplifier 31 using the measured value of the offset voltage of the first amplifier 31 of the current detection circuit 30 stored in the storage unit, performing A/D conversion on the corrected output value of the first amplifier 31, and further converting the output value to a current value.

When the inverter-integrated electric compressor 1 is in operation, the low-pressure refrigerant gas upon circulation through the refrigeration cycle is suctioned from the refrigerant intake port (not illustrated) into the electric motor housing 5, flows through the electric motor housing 5, and is drawn into the compression mechanism 4. The refrigerant gas compressed into a high-temperature, high-pressure gas by the compression mechanism 4 is circulated from the discharge port (not illustrated) provided to the end portion of the compressor housing 7, through discharge piping, to the refrigeration cycle. During this period, the low-temperature, low-pressure refrigerant gas that flows through the electric motor housing 5 absorbs an operation heat produced from the inverter device 2 inside the inverter case 9 via a housing outer wall portion or the like of the electric motor housing 5, and cools the heat-emitting elements such as the switching elements S. In this way, the circuit board 60 is indirectly cooled.

While the inverter-integrated electric compressor is operating, the voltage appearing as a voltage drop in the shunt resistor 32 serially connected to the inverter circuit 40 is amplified by the first amplifier 31 and output to the control unit 41. Additionally, the output of the first amplifier 31 is sequentially offset-corrected by the zero voltage detected by the second amplifier 21 with both ends set to ground potential. Thus, the input current of the inverter circuit 40 is detected on the basis of the offset-corrected output of the first amplifier 31.

Output of the first amplifier 31 is sequentially offset-corrected by the zero voltage detected by the second amplifier 21, making it possible to suppress the offset error after operation of the inverter-integrated electric compressor 1, even when a change in temperature occurs in the circuit board 60, and improve the accuracy of detecting the input current of the current detection circuit 30. While, during operation of the inverter-integrated electric compressor 1 for vehicular air conditioning equipment, the change in temperature is large compared to before startup due to the effects of the suctioned refrigerant, computations that cancel the sequential offset are performed in the present embodiment, making it possible to continually correct the change in temperature resulting from the cooling of the refrigerant. Further, the first amplifier 31 and the second amplifier 21 are integrated into the single integrated circuit X, thereby suppressing a temperature differential between the first amplifier 31 and the second amplifier 21 and thus making it possible to further suppress the offset error, even when there is a large change in temperature such as before and after startup of the inverter-integrated electric compressor 1.

With the circuit board 60 including the current detection circuit 30, the offset cancellation circuit 20, and the inverter circuit 40 thus configured, the offset error of the first amplifier 31 and the second amplifier 21 that occurs due to the change in temperature after operation of the electric motor 3 can be offset, making it possible to improve the accuracy of the input current of the inverter circuit 40 detected by the current detection circuit.

As described above, according to the inverter-integrated electric compressor 1 and the circuit board 60, and the method for manufacturing the circuit board 60 according to the present embodiment, the circuit board 60 obtained by integrating the first amplifier 31 that detects the input current that flows through the inverter circuit 40, and the second amplifier 21 that detects the offset voltage of the first amplifier 31 into a single circuit is incorporated into the inverter-integrated electric compressor 1.

As a result, while the inverter-integrated electric compressor 1 for vehicular air conditioning equipment exhibits a large change in temperature in the circuit board 60 after startup and operation compared to before startup due to the effects of the suctioned refrigerant, the first amplifier 31 and the second amplifier 21 integrated into the same integrated circuit have substantially the same temperature, making it possible to make the offset values of the first amplifier 31 and the second amplifier 21 equal, and thus decrease the detection error of the input current that flows through the inverter circuit 40 to the extent possible.

Further, with each component that constitutes the current detection circuit 30 and the offset cancellation circuit 20 being from the same lot in the manufacturing stage, the current detection circuit 30 and the offset correction circuit 20 exhibit less individual differences in temperature characteristics, accuracy variance, and the like, making it possible to decrease the detection error of the input current.

Further, the current detection circuit 30 and the offset cancellation circuit 20 are provided on the same plane of the circuit board 60 and the same ground plane 50, thereby decreasing the temperature unevenness between the current detection circuit 30 and the offset cancellation circuit 20. This makes it possible to further decrease the detection error of the input current that flows through the inverter circuit 40.

The present invention is not limited to the embodiment as described above, and changes can be made as appropriate without departing from the scope of the present invention.

REFERENCE SIGNS LIST

1 Inverter-integrated electric compressor
2 Inverter device
3 Electric motor
4 Scroll compression mechanism
20 Offset cancellation circuit (offset correction circuit)
25 Second peripheral components of offset cancellation circuit
30 Current detection circuit
32 Shunt resistor (current detection resistor)
35 First peripheral components of current detection circuit
50 Ground plane
60 Circuit board

The invention claimed is:

1. An inverter-integrated electric compressor that compresses and discharges a refrigerant suctioned into the inverter-integrated electric compressor, the inverter-integrated electric compressor comprising:
   an inverter device provided with a circuit board mounted with an inverter circuit, the inverter device being integrally incorporated in an inverter housing portion;
   the circuit board comprising:
   a current detection circuit that comprises a current detection resistor serially connected to the inverter circuit and detects a current, and a first amplifier that amplifies and outputs a voltage appearing as a voltage drop in the current detection resistor, the current detection circuit detecting an input current flowing through the inverter circuit; and
   an offset correction circuit comprising a second amplifier that performs an offset correction of the first amplifier;
   the first amplifier and the second amplifier being integrated into a single integrated circuit,
   wherein:
   the current detection circuit further comprises a first peripheral component for adjusting a value of the first amplifier; and
   the offset correction circuit further comprises a second peripheral component for adjusting a value of the second amplifier;
   the first peripheral component of the current detection circuit and the second peripheral component of the offset correction circuit each comprising a resistor from a same lot in a manufacturing stage.

2. The inverter-integrated electric compressor according to claim 1, wherein:
   the first amplifier, the second amplifier, the resistor included in the first peripheral component, and the resistor included in the second peripheral component of the current detection circuit and the offset correction circuit are mounted on a same plane of the circuit board and provided to a same ground plane.

3. A circuit board integrally incorporated as an inverter device in an inverter housing portion of an inverter-integrated electric compressor that compresses and discharges suctioned refrigerant, the circuit board comprising:
   an inverter circuit mounted on the circuit board;
   a current detection circuit, comprising:
   a current detection resistor serially connected to the inverter circuit and detects a current, and a first amplifier that amplifies and outputs a voltage appearing as a voltage drop in the current detection resistor, the current detection circuit detecting an input current flowing through the inverter circuit; and
   an offset correction circuit comprising a second amplifier that performs an offset correction of the first amplifier;
   the first amplifier and the second amplifier being integrated into a single integrated circuit,
   wherein:
   the current detection circuit further comprises a first peripheral component for adjusting a value of the first amplifier; and
   the offset correction circuit further comprises a second peripheral component for adjusting a value of the second amplifier;
   the first peripheral component of the current detection circuit and the second peripheral component of the offset correction circuit each comprising a resistor from a same lot in a manufacturing stage.

4. A method for manufacturing a circuit board integrally incorporated as an inverter device in an inverter housing portion of an inverter-integrated electric compressor that compresses and discharges a refrigerant suctioned into the inverter-integrated electric compressor, the method comprising the steps of:
   mounting an inverter circuit; and
   integrating a first amplifier of a current detection circuit that amplifies and outputs a voltage appearing as a voltage drop in a current detection resistor serially connected to the inverter circuit and detects a current, and a second amplifier of an offset correction circuit that performs offset correction of the first amplifier into a single integrated circuit;
   the current detection circuit comprising a first peripheral component for adjusting a value of the first amplifier;
   the offset correction circuit comprising a second peripheral component for adjusting a value of the second amplifier; and
   the first peripheral component of the current detection circuit and the second peripheral component of the offset correction circuit each comprising a resistor from a same lot in a manufacturing stage.

* * * * *